(12) United States Patent
Zarinkia (10) Patent No.: US 9,474,416 B2
(45) Date of Patent: Oct. 25, 2016

(54) BARBECUE GRILL OILING DEVICE

(71) Applicant: Mansour Zarinkia, Lenexa, KS (US)

(72) Inventor: Mansour Zarinkia, Lenexa, KS (US)

( * ) Notice: Subject to any disclaimer, the term of this patent is extended or adjusted under 35 U.S.C. 154(b) by 0 days.

(21) Appl. No.: 14/631,316

(22) Filed: Feb. 25, 2015

(65) Prior Publication Data

US 2015/0257595 A1   Sep. 17, 2015

Related U.S. Application Data

(60) Provisional application No. 61/951,136, filed on Mar. 11, 2014.

(51) Int. Cl.
*A47J 37/07* (2006.01)

(52) U.S. Cl.
CPC ................... *A47J 37/0786* (2013.01)

(58) Field of Classification Search
CPC combination set(s) only.
See application file for complete search history.

(56) References Cited

U.S. PATENT DOCUMENTS

| | | | |
|---|---|---|---|
| 1,733,144 A * | 10/1929 | Walker | A46B 11/0013 15/184 |
| 2,480,023 A * | 8/1949 | Holden | A61H 7/002 15/159.1 |
| 2,641,011 A * | 6/1953 | Caronia | A46B 11/0013 222/191 |
| 2,772,430 A | 7/1955 | Moritt | |
| 5,671,498 A * | 9/1997 | Martin | A47L 13/16 15/104.93 |
| 6,443,646 B1 | 9/2002 | MacDonald | |
| 7,264,413 B2 * | 9/2007 | Vosbikian | A47L 13/12 15/116.2 |
| 8,099,822 B2 | 1/2012 | Dale et al. | |
| 8,202,016 B2 | 6/2012 | Wales | |
| 8,220,103 B1 * | 7/2012 | Lewis | A47L 13/20 15/118 |
| 8,262,307 B1 | 9/2012 | Cross | |
| 2005/0207820 A1 | 9/2005 | Franczak et al. | |
| 2006/0029457 A1 | 2/2006 | Dale et al. | |
| 2009/0056748 A1 | 3/2009 | Wales | |
| 2012/0063836 A1 | 3/2012 | Gilbert et al. | |

\* cited by examiner

*Primary Examiner* — David Walczak
(74) *Attorney, Agent, or Firm* — Erickson Kernell IP, LLC (57) ABSTRACT

A grill oiling apparatus for applying oil to a barbecue grill grate. The apparatus includes a handle with an oil reservoir disposed therein. An arm extends from the handle to an attachment flange to which an applicator pad is removeably coupled. A passageway extends between the reservoir and the attachment flange to provide oil from the reservoir onto the applicator pad to at least partially saturate the pad. The pad is placed into contact with a cooking surface such as a grill grate to apply the oil therein onto the grill grate and/or to scrub residue or debris from the grill grate. A heat shield may be provided between the handle and the cooking surface to protect a user's had from exposure to heat from the cooking surface. The applicator pad is removable for replacement or washing.

18 Claims, 5 Drawing Sheets

BARBECUE GRILL OILING DEVICE

CROSS-REFERENCE TO RELATED APPLICATIONS

This application claims the benefit of U.S. Provisional Patent Application No. 61/951,136, filed Mar. 11, 2014, the disclosure of which is hereby incorporated herein in its entirety by reference.

BACKGROUND

Cooking on barbeque grills over an open flame or smoldering charcoals is a popular method for preparing foods. Apparatus for such forms of cooking typically include a wire grate or metallic platform with a plurality of spaced-apart parallel bars or ridges upon which food is supported over the flame or charcoals. Other cooking apparatus, such as griddles, ovens and cooktops may employ similar cooking surfaces.

In order to prevent food from sticking to the grate during cooking and to clean the grate of residues from previous cooking sessions, the grate may be seasoned by applying a coating of one or more cooking oils. The oils may be applied by wiping the grate with a cloth or rag that is at least partially saturated with the oil. The wiping motion removes residues on the grate and applies the fresh coating of oil thereon. Application of the oil to the grate is often completed with the grate positioned over the heat source and after the grate has been at least partially preheated by the heat source. As such, the user risks burns and exposure to high heat emanating from the heat source when attempting to season the grate.

There is thus a need for a device that can apply one or more oils to a grill grate or cooking surface without exposing a user to burns. A device with interchangeable applicator pads and a self-contained oil reservoir would also be beneficial.

SUMMARY

Embodiments of the invention are defined by the claims below, not this summary. A high-level overview of various aspects of the invention are provided here for that reason, to provide an overview of the disclosure, and to introduce a selection of concepts that are further described in the Detailed-Description section below. This summary is not intended to identify key features or essential features of the claimed subject matter, nor is it intended to be used as an aid in isolation to determine the scope of the claimed subject matter. In brief, this disclosure describes, among other things, a grill-oiling apparatus for applying one or more oils or fluids to a cooking surface.

The grill oiling apparatus includes a handle having a reservoir for retaining one or more cooking oils therein. The handle is coupled to an elongate angled arm having a passageway extending therethrough and in fluid communication with the reservoir. An attachment flange is provided at a distal end of the arm and includes an applicator pad removeably coupled thereto. The passageway in the arm extends into fluid communication with the applicator pad to provide the oils thereto. A fluid distribution plate is positioned at a distal end of the passageway to evenly distribute the oils across the applicator pad. The handle includes a trigger or valve mechanism to selectively enable the oil in the reservoir to flow into the passageway and to the applicator pad. A heat shield or guard may be disposed beneath the handle and positioned between a user's hand grasping the handle and a heat source during application of the oil to the cooking surface. The applicator pad may be removed for washing and may be discarded or replaced by a clean applicator pad when soiled.

DESCRIPTION OF THE DRAWINGS

Illustrative embodiments of the invention are described in detail below with reference to the attached drawing figures, and wherein.

DETAILED DESCRIPTION

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described.

With reference now to FIGS. 1-7, a grill-oiling apparatus 10 is described in accordance with an embodiment of the invention. The grill-oiling apparatus 10 is described herein with respect to preparation of a barbecue grill for cooking having a grate formed from wires or rods arranged in a spaced apart configuration and disposed over a heat source, such as smoldering charcoal briquettes or an open gas flame. However, such is not intended to limit embodiments of the invention to any particular use. It is to be understood that a variety of barbecue grill cooking surfaces as well as other forms of cooking surfaces that may benefit from application of cooking oils or greases are known in the art. Embodiments of the invention are useable and configurable for use with such other cooking surfaces.

The grill-oiling apparatus 10 is described with respect to application of cooking oils. Such description is not intended to limit the apparatus 10 to a particular material or fluid to be applied thereby. For example, the grill oiling apparatus 10 can be employed for application of oils, greases, butters, or other cooking products or combinations thereof and can be used to apply non-cooking products, such as cleaners, abrasives, degreasing chemicals, or the like.

Figure 1:
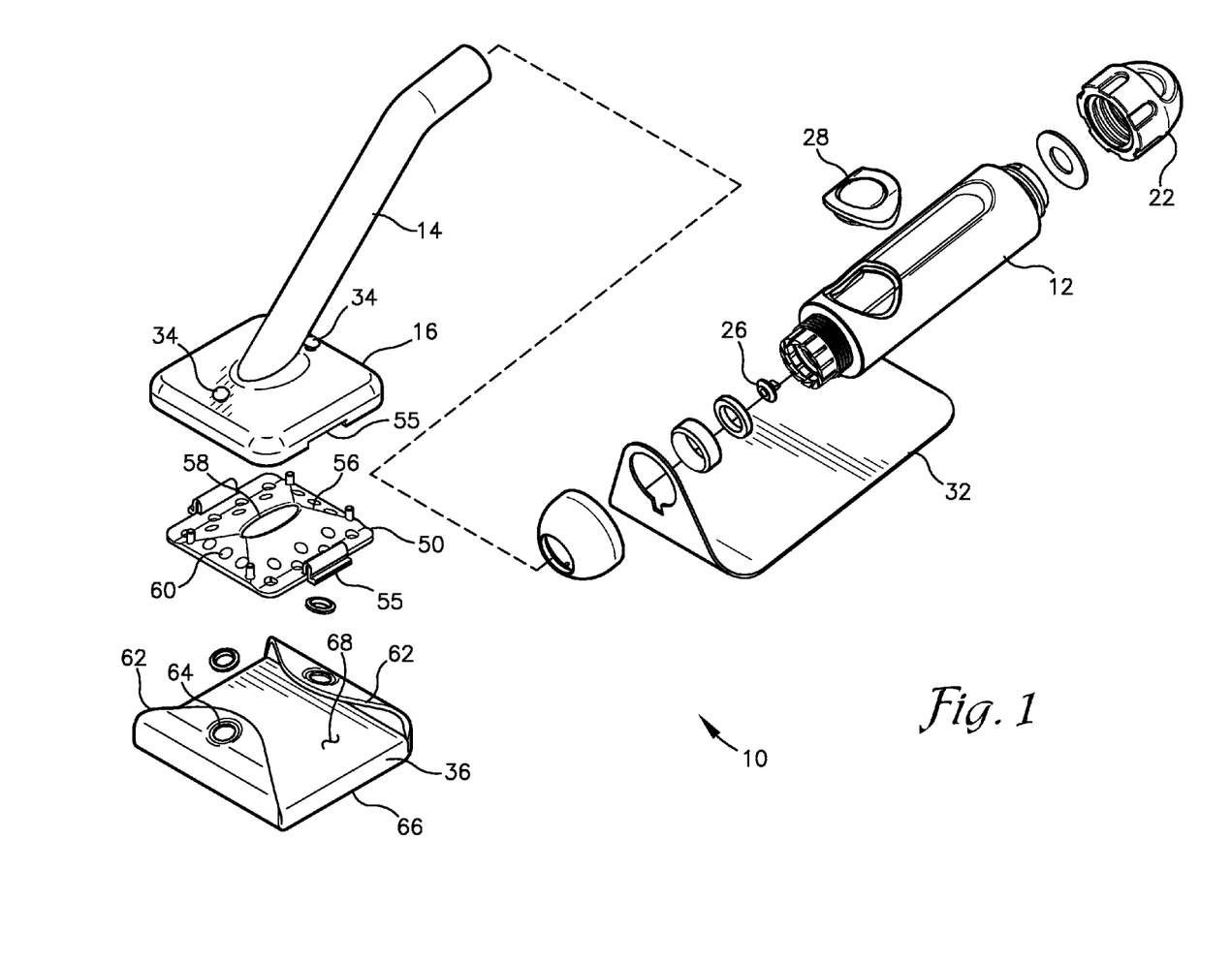
FIG. 1 is an exploded view of grill-oiling apparatus depicted in accordance with an embodiment of the invention.

The grill-oiling apparatus 10 includes a handle 12, an arm 14 extending therefrom, and an attachment flange 16 disposed at a distal end of the arm 14. The handle 12, arm 14, and attachment flange 16 may be formed as a single integrated component or may be assembled from one or more subcomponents. The handle 12 comprises a generally cylindrical body that is sized and configured for grasping by a hand of a user. Features, such as ribs, nubs, ridges, contours, and/or texturized areas may be provided on or formed on an exterior surface of the handle 12 to aid a user in gripping the handle 12.

A reservoir 20 for holding a cooking oil, cleaning fluid, or other liquid is formed by an interior surface of the handle 12. The reservoir 20 might also be a separate component that is disposed in the handle 12 or formed integral with the interior of the handle 12. The reservoir 20 is open at each end of the handle 12.

A proximate end of the handle 12 is provided with a closure 22, such as a threaded or snap-fit lid that seals and retains the cooking oil within the proximate end of the reservoir 20. The closure 22 may be removable to enable filling of the reservoir 20 with oil. An opposite or distal end of the handle 12 couples to the arm 14 via, for example, a threaded coupling; other forms of couplings like snap-fit, friction-fit, bayonette-style, or the like can also be employed. The opposite end of the reservoir 20 is thus placed in fluid communication with a passageway 24 carried by the arm 14.

The arm 14 extends from the handle 12 a distance suitable to provide a desired separation distance between the handle 12 and a heat source during use of the grill-oiling apparatus 10 to apply oil to a cooking surface. In an embodiment, the arm 14 is approximately eighteen inches in length, but any desired length can be employed. The arm 14 is directed at a downward angle, e.g. approximately 45°, with respect to the handle 12. The downward angle of the arm 14 may provide the handle 12 at a comfortable orientation for gripping by the user during use and may provide a sufficient vertical separation of the handle 12 and a user's hand from the heat source during use of the apparatus 10. The arm 14 may be generally linear, or the arm 14 may be at least partially curvilinear or formed from a plurality of linear or curvilinear sections. In another embodiment, the arm 14 and the handle 12 are aligned to extend linearly. The arm 14 has sufficient strength to resist substantial bending when a force is applied between the handle 12 and the attachment flange 16, such as when a user presses the attachment flange 16 onto a grill grate to apply oils thereon and/or to scrub the grill grate.

Figure 2:
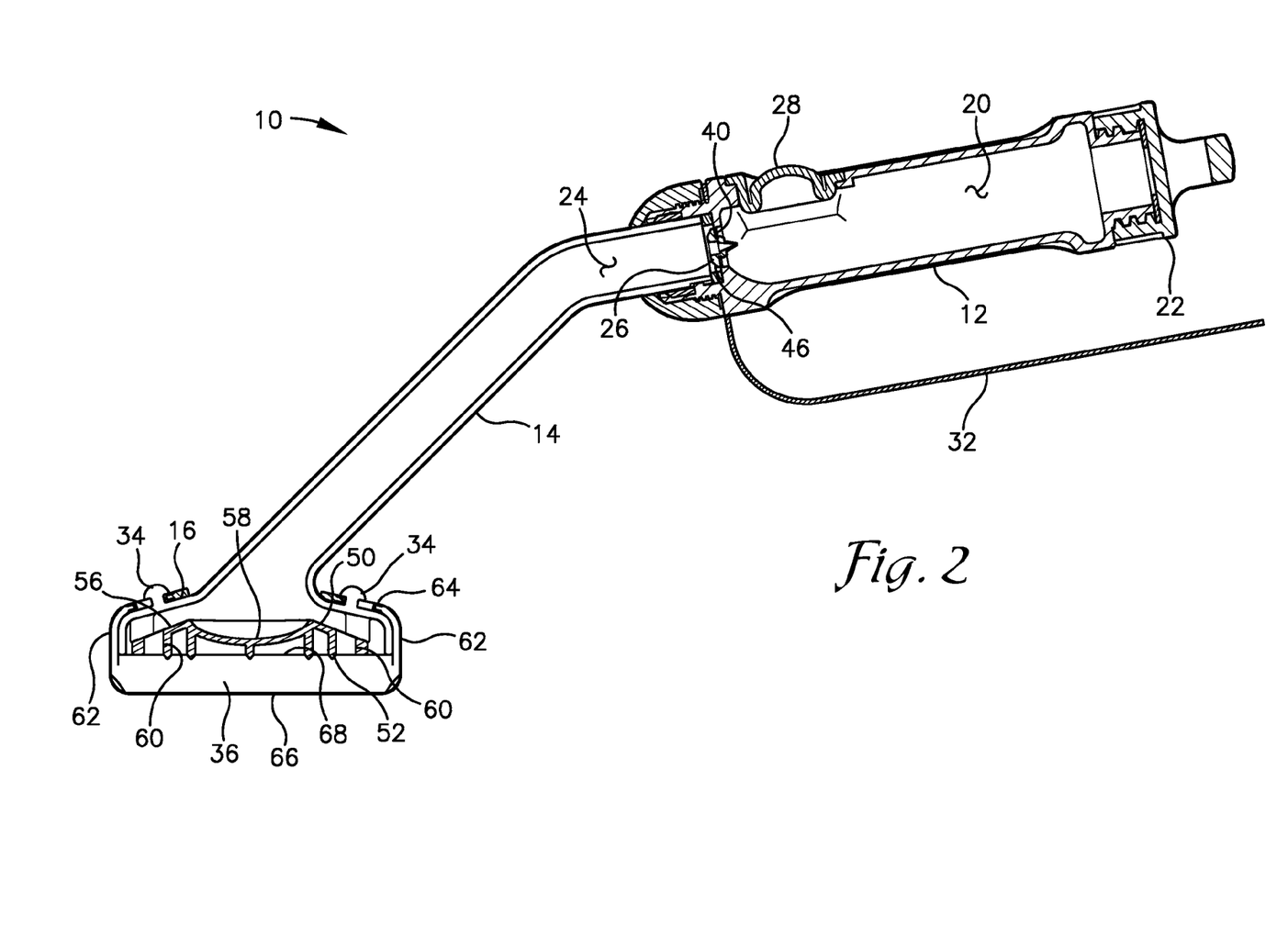
FIG. 2 is a side elevational, cross-sectional view of the grill-oiling apparatus of FIG. 1.

The arm 14 carries the passageway 24 interior to the arm 14. As depicted in FIG. 2, the passageway 24 is formed by an interior wall of the arm 14 but in some embodiments may comprise a tube or hose disposed within the arm 14. In another embodiment, the passageway 24 might be disposed exterior to the arm 14, such as in a tube or hose extending alongside the arm 14. The passageway 24 is configured to carry the oil from the reservoir 20 to the attachment flange 16.

Figure 3:
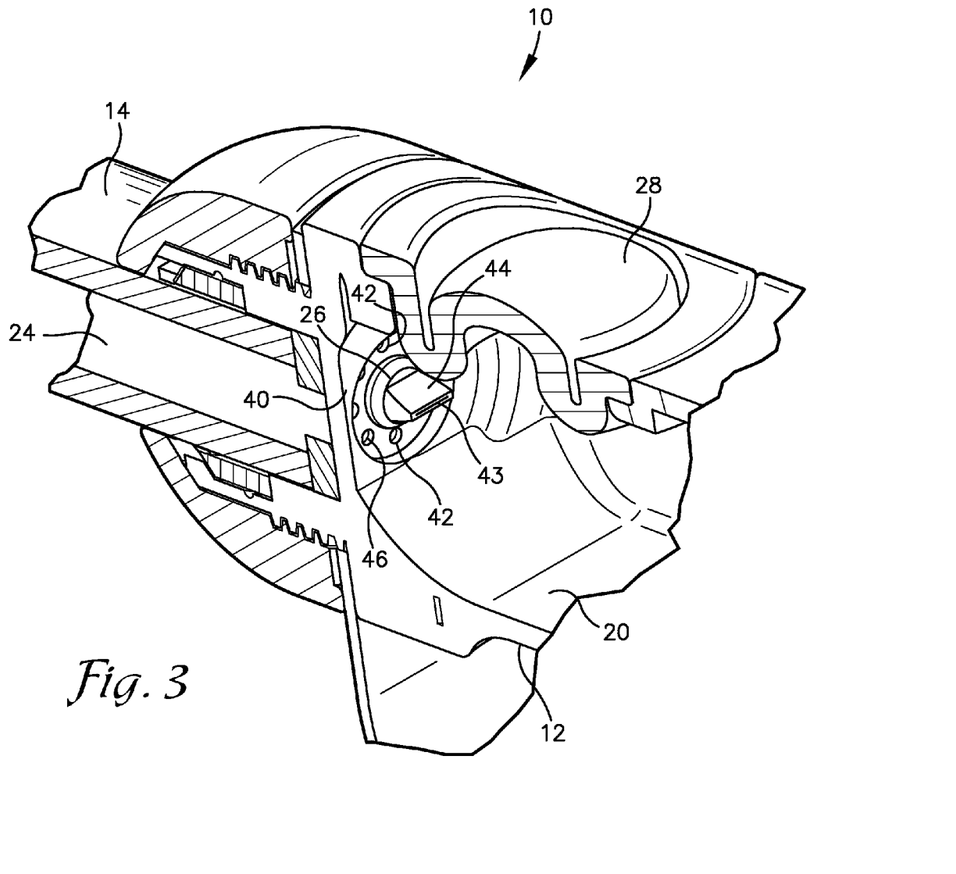
FIG. 3 is an enlarged, cross-sectional, perspective view depicting a valve of the grill-oiling apparatus of FIG. 1.
Figure 4:
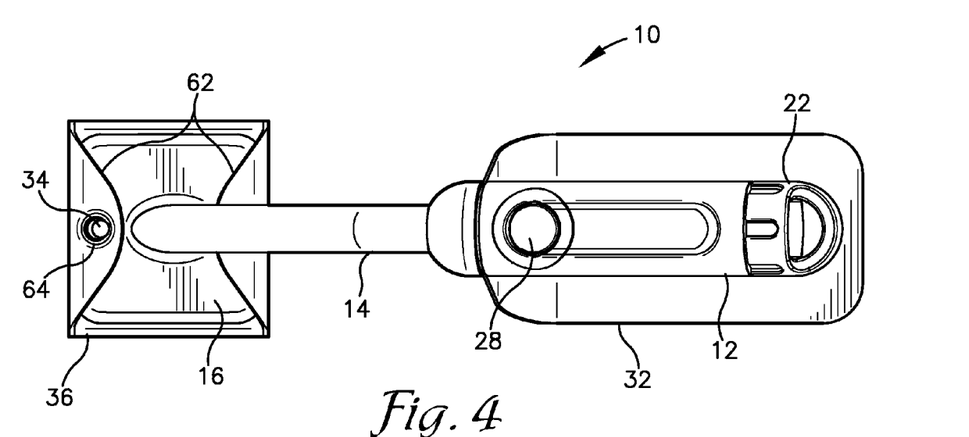
FIG. 4 is a top plan view of the grill-oiling apparatus of FIG. 1.

A valve 26 is provided between the reservoir 20 and the passageway 24 to selectively restrict flow of the oil from the reservoir 20 to the passageway 24. In some embodiments, the valve 26 may be positioned along the length of the passageway 24. The valve 26 is any form of valve or means for obstructing the flow of oil through the passageway 24. As depicted in FIGS. 1-3, the valve 26 comprises a two-way duckbill-style valve that allows oil to flow into the passageway 24 from the reservoir 20 when the reservoir is pressurized and allows air to flow from the passageway 24 into the reservoir 20 when the pressurization of the reservoir 20 is relieved. An endwall 40 of the reservoir 20 includes an aperture in which the valve 26 is disposed and a plurality of through-holes 42 surrounding the aperture. The valve 26 includes a wedge-shaped nipple 44 extending into the reservoir 20. A central bore 43 extends through and is closed off at its terminal end by the nipple 44 within the reservoir 20 but is open to the passageway 24 at an opposite end. The valve 26 also includes a flange 46 positioned within the passageway 24 and that extends radially outward into overlapping relationship with the through-holes 42 in the endwall 40. The valve 26 thus prevents oil from moving from the reservoir 20 into the passageway 24; the nipple 44 closes off the central bore 43 and the flange 46 closes off the through-holes 42.

As depicted in FIGS. 1-3, a trigger or a depressible button 28 is provided to enable a user to expel oil from the reservoir 20 through the valve 26. The button 28 comprises a resilient or elastic member that can be depressed toward the interior of the reservoir 20 to increase the pressure within the reservoir 20. When pressure within the reservoir 20 is increased, the flange 46 may be flexed away from the endwall 40 thereby opening the through-holes 42 to allow passage of oil therethrough. The pressurization may also seal or further seal the nipple 44 against passage of the oil through the central bore 43.

When released, the button 28 returns to a normal position and thereby relieves pressure in the reservoir 20 and/or creates an at least partial negative pressure within the reservoir 20. Upon relieving the pressure in the reservoir 20 the flange 46 returns to its normal position against the endwall 40 and closes off the through-holes 42. Relieving the pressure and/or creating a negative pressure may also draw air through the central bore 43; the nipple 44 opens, e.g. opposite sides thereof flex away from one another, to enable passage of the air through the central bore 43 and into the reservoir 20.

In other embodiments, the valve 26 may comprise, for example, a ball valve, stop-cock, needle valve, or the like. Or the valve 26 may be a compression valve that compresses the passageway 24 to block flow therethrough. In another embodiment, the valve 26 includes an actuator, such as a rotatable lever, knob, or trigger that is useable to open and close the valve 26 to allow oil to flow through the passageway 24, such as by gravity or capillary action and/or to expel oil from the reservoir 20 under pressure.

A heat shield 32 may be provided to extend from on one or both of the handle 12 and the arm 14 to extend beneath the handle 12 so as to be positioned between the handle 12 and a heat source during application of the oil to the grill grate. The heat shield 32 comprises a generally planar or arcuate plate that is configured to block at least a portion of heat emanating from the heat source from direct contact with at least a portion of the handle 12 and/or a user's hand that is grasping the handle 12.

The attachment flange 16 comprises a generally planar flange that is intersected by the distal end of the arm 14. The attachment flange 16 has dimensions substantially similar to those of an applicator pad 36 such that the applicator pad 36 can be supported by the attachment flange 16 during application of oil to the grill. In another embodiment, the applicator pad 36 is rigid or semi-rigid and/or is self-supporting. An exterior face of the attachment flange 16 may include studs 34, hooks, tabs, hook-and-loop fasteners like VELCRO, snaps, buttons, adhesives, or the like configured to couple to an applicator pad 36, as described below.

The attachment flange 16 includes a distribution plate 50 disposed within an underside thereof and in fluid communication with the passageway 24. The distribution plate 50 is dimensioned to extend substantially the width of the attachment flange 16 to provide a support surface 52 against which the applicator pad 36 may be supported. The support surface 52 may include gripping features 54, such as nubs, ridges, points, or the like that are configured to grip the applicator pad 36 and resist movement of the applicator pad 36 relative to the support surface 52. Mating coupling elements 55 are provided on the attachment flange 16 and the distribution plate 50 to removeably couple the distribution plate 50 to the attachment flange 16. As depicted in FIGS. 2 and 5-7, the coupling elements 55 may comprise flexible tabs or flanges and mating notches or slots.

Figure 5:
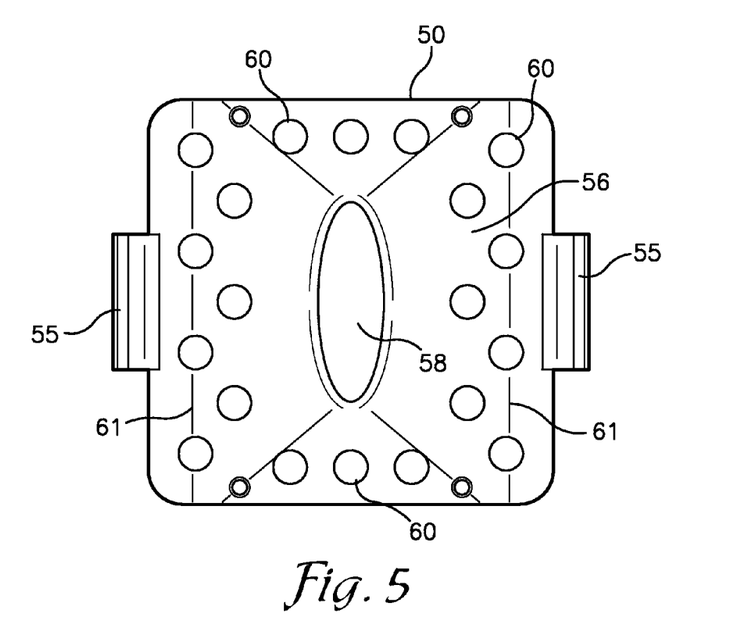
FIG. 5 is a top plan view of an oil-distribution plate of the grill-oiling apparatus of FIG. 1 depicted in accordance with an embodiment of the invention.
Figure 6:
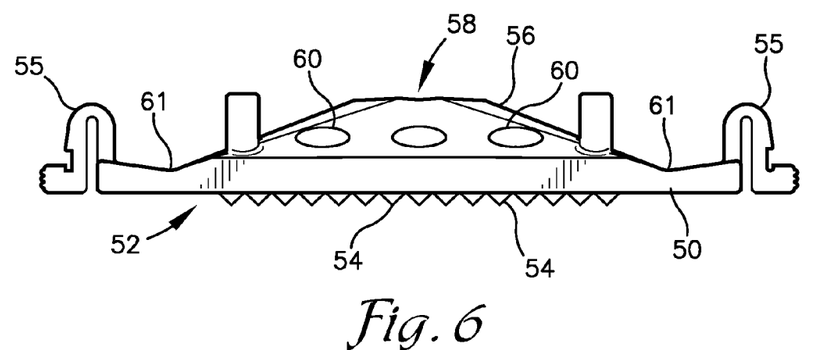
FIG. 6 is a side elevational view of the oil-distribution plate of FIG. 5.
Figure 7:
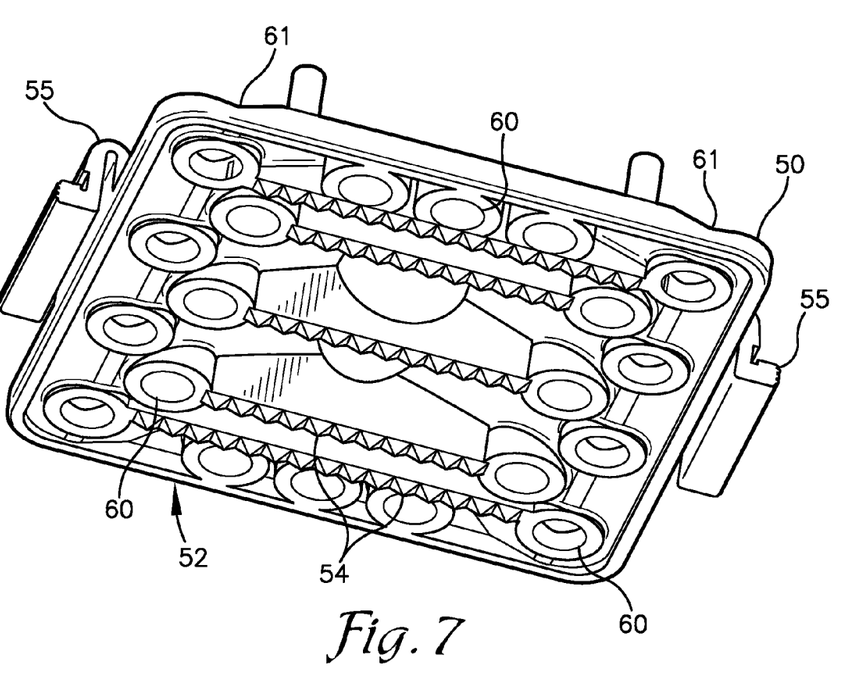
FIG. 7 is a bottom-side, plan view of the oil-distribution plate of FIG. 5.

An opposite, top surface 56 of the distribution plate 50 aids to distribute oil received from the passageway 24 to the applicator pad 36. The distribution plate 50 preferably evenly distributes the oil across the applicator pad 36 or may distribute the oil to desired locations thereon. The distribution plate 50 preferably distributes the oil among a plurality of locations on the applicator pad 16. The top surface 56 is configured with a generally pyramidal, conical, or truncated pyramidal or conical form having a depression 58 disposed at the apex thereof and positioned substantially in alignment with the distal end of the passageway 24. A plurality of outlet holes 60 are provided in the distribution plate 50. The outlet holes 60 are spaced away from the depression 58 toward the perimeter of the distribution plate 50. A trough 61 extends along each lateral side of the distribution plate 50 adjacent a respective edge thereof and intersecting at least one outlet hole 60. The outlet holes 60 may be evenly spaced, staggered, or otherwise arranged about the top surface 56. The outlet holes 60 preferably comprise circular openings, but may take any form including, for example, slots.

The applicator pad 36 comprises one or more fabric layers arranged to receive the oil from the distribution plate 50, disperse the oil throughout the pad 36, and distribute the oil onto a grill grate through rubbing or sliding contact therewith. The applicator pad 36 can be configured for one or both of application of oil to the grill grate and cleaning of the grill grate. An abrasive or resilient mesh or similar material layer may be provided on a contact surface of the pad 36 to aid cleaning and/or scrubbing debris and residues from the grill grate surface. In an embodiment, the applicator pad 36 can comprise one or more non-fabric layers such as pumice stones, abrasive stones, composite materials, or the like. The applicator pad 36 may be configured as a disposable item that can be discarded when soiled and replaced with a new clean pad 36. Or the applicator pad 36 may be washable to allow washing and reuse of the pad 36.

The applicator pad 36 includes a pair of wings 62 extending from opposite edges thereof that are configured to couple to the studs 34 on the attachment flange 16. For example, the applicator pad 36 may be placed against a bottom surface of the attachment flange 16 and the wings 62 wrapped at least partially around the edges of the flange 16 and into engagement with the studs 34. The wings 62 include coupling features, such as apertures 64 into which the studs 34 may be inserted. The studs 34 may include an enlarged head or other feature configured to resist disengagement of the studs 34 with the apertures 64.

The wings 62 extend from opposite edges of the applicator pad 36 and are preferably positioned substantially midway between a first and a second working surface 66, 68 of the pad 36 or near the center of the pad 36 thickness. The wings 62 are pivotable about their connection with the applicator pad 36 to extend generally perpendicularly to the body or working surfaces 66, 68 of the applicator pad 36. The wings 62 may thus extend alongside respective longitudinal edges of the attachment flange 16 and wrap therearound to engage the studs 34. The wings 62 may be pivoted toward either working surface 66, 68 to enable selective use of both working surfaces 66, 68 by flipping the applicator pad 36 over and pivoting the wings 62 in the opposite direction. The applicator pad 36 may be configured with differing materials on the opposing working surfaces 66, 68 such that the pad 36 may be used for different purposes based on which working surface 66, 68 is positioned to face away from the attachment flange 16, e.g. the first working surface 66 may include scrubbing or cleaning materials while the opposite second working surface 68 may include a softer material for applying oil.

In operation, the grill-oiling apparatus 10 is useable to apply a layer of cooking oil to a grill grate or similar cooking surface. The cooking surface can be preheated or the oil can be applied prior to heating. The reservoir 20 is at least partially filled with the oil to be applied to the grill grate and the closure 22 coupled to the handle 12. The applicator pad 36 is coupled to the attachment flange 16 by placing the second working surface 68 against the support surface 52 of the distribution plate 50; pivoting the wings 62 toward the attachment flange 16; and engaging the apertures 64 in the wings 62 with the studs 34. The handle 12 is grasped by a user and the button 28 is depressed and released one or more times to expel oil from the reservoir 20, through the valve 26, and into the passageway 24. The oil flows down the passageway 24 by gravity.

Upon reaching the distal end of the passageway 24, the oil flows into and collects in the depression 58 in the distribution plate 50. The oil may overfill the depression and thus overflow therefrom to run along the top surface 56 of the distribution plate 50 to the outlet holes 60. Or the oil in the depression 58 may be jostled from the depression and onto the top surface 56 of the distribution plate 50 by movements of the grill-oiling apparatus 10 in a back-and-forth motion along a grill grate. The oil flows through the outlet holes 60 and into the applicator pad 36, which becomes at least partially saturated.

Oil flowing along the top surface of the distribution plate 50 that passes between the outlet holes 60 is retained against flowing outward from between the applicator pad 36 and the attachment flange 16. Oil flowing longitudinally along the top surface 56 and between the outlet holes 60 contacts the wings 62 which direct the oil toward and/or into longitudinal edges of the applicator pad 36. Oil flowing laterally along the top surface 56 and between the outlet holes 60 collects in the troughs 61, which extend in the longitudinal direction adjacent the lateral edges of the distribution plate 50. The troughs 61 direct the oil into one or more outlet holes 60 that are intersected by the trough 61 or into contact with the wings 62 which intersect the terminal ends of the troughs 61.

The user places the working surface 66 of the applicator pad 36 into contact with the grill grate and moves the pad 36 along the grill grate. Gravity and/or pressure applied on the applicator pad 36 and against the grill grate causes at least a portion of the oil to be expelled from the pad 36 and onto the grill grate to at least partially coat the grate. In some embodiments, the user may also scrub the applicator pad 36 against the grill grate to apply the oil thereto and/or to remove residues and debris from the grill grate, such as debris left behind from previous uses of the grill.

The applicator pad 36 may be removed from the attachment flange 16 when soiled. The soiled pad 36 may be washed or replaced with a new applicator pad 36. Or the applicator pad 36 may be flipped over to expose the second working surface 68 and reattached to the attachment flange 16 for further use. In one embodiment, a variety of applicator pads 36 are provided. For example, a first abrasive applicator pad 36 may be used to clean the grill grate. The first pad 36 can then be removed and replaced with a second softer applicator pad 36 for application of the oil to the grill grate. In another embodiment, the first working surface 66 of the applicator pad 36 is comprised of materials configured to aid cleaning of the grill grate and the second working surface 68 is comprised of materials that may be more suitable for applying oil to the grill grate. The applicator pad 36 may thus be installed with the first working surface 66 exposed for cleaning the grill grate and then removed and flipped over to expose the second working surface 68 for oiling the grill grate.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to demarcate those structures as including a plurality of possible arrangements or designs within the scope of this disclosure and readily identifiable by one of skill in the art to perform the particular function in a similar way without specifically listing all such arrangements or designs. Certain features and subcombinations are of utility and may be employed without reference to other features and subcombinations and are contemplated within the scope of the claims.

What is claimed is:

1. A grill-oiling apparatus comprising:
   a handle with a reservoir disposed therein;
   an attachment flange;
   an applicator pad coupled to the attachment flange, the applicator pad including a pair of wings, each wing extending from an opposite edge of the applicator pad and being pivotable about the respective edge;
   a distribution plate disposed between at least a portion of the attachment flange and the applicator pad, the distribution plate including a top surface that slopes downwardly toward a perimeter of the distribution plate and includes a plurality of outlet holes extending through the top surface; and
   a passageway extending in fluid communication between the handle and the attachment flange to enable flowing of a fluid contained within the reservoir through the passageway, onto the top surface of the distribution plate, and through at least one of the outlet holes to the applicator pad to at least partially saturate the applicator pad, the applicator pad being adapted to apply the fluid to a cooking surface via contact of the applicator pad with the cooking surface.

2. The grill-oiling apparatus of claim 1, wherein the top surface of the distribution plate includes a depression positioned at an apex of the top surface.

3. The grill-oiling apparatus of claim 1, wherein the top surface includes a trough extending adjacent a perimeter of the distribution plate, the trough intersecting at least one of the outlet holes.

4. The grill-oiling apparatus of claim 1, wherein the edges of the applicator pad have a thickness, and wherein the wings are positioned substantially at a midpoint of the thickness.

5. The grill-oiling apparatus of claim 4, wherein the applicator pad includes a first and a second working surface that are substantially planar and oppositely facing, the first and second working surfaces being spaced apart by the thickness, and wherein the wings are selectively pivotable toward the first working surface or the second working surface.

6. The grill-oiling apparatus of claim 5, wherein the applicator pad is selectively coupleable to the attachment flange with the first working surface directed away from the attachment flange or with the second working surface directed away from the attachment flange.

7. The grill-oiling apparatus of claim 1, wherein the applicator pad is washable.

8. The grill-oiling apparatus of claim 1, wherein the applicator pad includes first and second oppositely facing working surfaces, and wherein the first and second working surfaces are at least partially comprised of differing materials.

9. The grill-oiling apparatus of claim 1, further comprising:
   a valve that selectively controls flow of the fluid from the reservoir into the passageway; and
   an actuator that is actuated to expel fluid from the reservoir through the valve by increasing the pressure within the reservoir.

10. A grill-oiling apparatus comprising:
    a handle with a reservoir disposed therein;
    an attachment flange;
    an applicator pad coupled to the attachment flange;
    a distribution plate disposed between at least a portion of the attachment flange and the applicator pad, the distribution plate having a top surface with a truncated cone or truncated pyramidal form that slopes downwardly toward a perimeter of the distribution plate and includes a plurality of outlet holes extending through the top surface, the top surface including a depression located at an apex of the truncated cone or truncated pyramidal form; and
    a passageway extending in fluid communication between the handle and the attachment flange to enable flowing of a fluid contained within the reservoir through the passageway, into the depression in the top surface of the distribution plate, and through at least one of the outlet holes to the applicator pad to at least partially saturate the applicator pad, the applicator pad being adapted to apply the fluid to a cooking surface via contact of the applicator pad with the cooking surface.

11. The grill-oiling apparatus of claim 10, wherein the applicator pad includes a pair of wings, each wing extending from an opposite edge of the applicator pad and being pivotable about the respective edge.

12. The grill-oiling apparatus of claim 11, wherein the edges of the applicator pad have a thickness, and wherein the wings are positioned substantially at a midpoint of the thickness.

13. The grill-oiling apparatus of claim 12, wherein the applicator pad includes a first and a second working surface that are substantially planar and oppositely facing, the first and second working surfaces being spaced apart by the thickness, and wherein the wings are selectively pivotable toward the first working surface or the second working surface.

14. The grill-oiling apparatus of claim 13, wherein the applicator pad is selectively coupleable to the attachment flange with the first working surface directed away from the attachment flange or with the second working surface directed away from the attachment flange.

15. The grill-oiling apparatus of claim 10, wherein the applicator pad includes first and second oppositely facing working surfaces, and wherein the first and second working surfaces are at least partially comprised of differing materials.

16. A grill-oiling apparatus comprising:
a handle with a reservoir disposed therein;
an attachment flange;
an applicator pad removably coupled to the attachment flange, the applicator pad including a first and a second oppositely facing working surface that are spaced apart by a thickness of the applicator pad, and the applicator pad including a pair of wings, each wing extending from an opposite edge of the applicator pad and being pivotable about the respective edge, wherein the applicator pad is selectively coupleable to the attachment flange with the first working surface directed away from the attachment flange or with the second working surface directed away from the attachment flange;
a distribution plate disposed between at least a portion of the attachment flange and the applicator pad, the distribution plate including a top surface that slopes downwardly toward a perimeter of the distribution plate and includes a plurality of outlet holes extending through the top surface; and
a passageway extending in fluid communication between the reservoir and the attachment flange to enable flowing of a fluid contained within the reservoir through the passageway, onto the top surface of the distribution plate, and through at least one of the outlet holes to the applicator pad to at least partially saturate the applicator pad, the applicator pad being adapted to apply the fluid to a cooking surface via contact of the applicator pad with the cooking surface.

17. The grill-oiling apparatus of claim 16, wherein the top surface of the distribution plate includes a depression positioned at an apex of the top surface.

18. The grill-oiling apparatus of claim 16, wherein the top surface includes a trough extending adjacent the perimeter of the distribution plate, the trough intersecting at least one of the outlet holes.

* * * * *